United States Patent Office 2,914,376
Patented Nov. 24, 1959

2,914,376

SPINNING OF FIBERS AND FILMS FROM PARTICULATE DISPERSIONS

Aubert H. Bibolet, Feasterville, Pa., George L. Brown, Moorestown, and Robert P. Fellmann, Collingswood, N.J., and George A. Richter, Jr., Abington, Pa., assignors to Rohm & Haas Company, Philadelphia, Pa., a corporation of Delaware No Drawing. Application September 6, 1955
Serial No. 532,789

19 Claims. (Cl. 18—54)

This invention concerns a process for preparing filaments, yarns, foils, and films from aqueous dispersions of water-insoluble thermoplastic copolymers. According to this process, an aqueous dispersion of a thermoplastic copolymer having an apparent second order transition temperature between 30° and 150° C., containing polar groups, and being suspended with an acid-sensitive emulsifying agent is passed through an orifice or opening into an acidic coagulating bath, wherein a shaped product is formed, which is dried, fused, and usually stretched. Additional procedural steps to which the shaped product may be subjected comprise washing, cross-linking, curing, stabilizing, and/or finishing.

It has been proposed to coagulate non-elastic thermoplastic resinous materials, such as polyvinylidene chloride, by use of a salt bath and to form discontinuous filaments from aqueous dispersions so that the emulsifier and impurities can be washed away from the coagulated resinous material. The washed coagulate could then be molded to give light colored, clear objects. This proposed method did not, however, yield strong, self-supporting filaments, fibers, or films.

The forming of continuous filaments or the like has heretofore been effected from solutions or from melts for practical purposes. These methods have inherent limitations, which it would be desirable to avoid. It is believed that they are avoided by the process of the present invention.

According to this invention, filaments, fibers, yarns, and films are formed from water-insoluble thermoplastic copolymers in aqueous dispersion. This permits use of a high concentration of the polymeric substance providing the filaments, fibers, yarns or films. Also, this method requires relatively simple steps, apparatus, and reagents.

Polymers which have proven useful for the preparation of filaments, yarns, films, and the like by the process of this invention possess a number of properties which serve to define operative materials. It has already been stated that these are thermoplastic in nature and that they must have an apparent second order transition temperature as herein defined, designated as $T_i$, between 30° and 150° C.

It will be noted also that these materials are copolymers from two or more polymerizable monovinylidene compounds. Copolymerization is apparently necessary to provide polymer chains of the mobility necessary for proper joining of particles from the dispersions with required coalescence and for successful stretching with resulting ordering of molecules. To accomplish such ends it seems necessary to avoid the rigidity of some homopolymers even though they may fall within the essential range of apparent second order transition temperatures.

Although one polymerizable monovinylidene compound may be used in preponderant amount or proportion, at least about 5% by weight of the copolymer must be supplied by at least one other compatible comonomer. Above this minimum proportion, there may be used a wide range of proportions of two or more comonomers, provided, of course, that the resultant copolymer has a proper $T_i$ value, is linear, and contains polar groups (that is, groups having atoms other than just carbon and hydrogen).

The thermoplastic copolymers used must be capable of being formed by emulsion polymerization to give aqueous dispersions in which the dispersed particles have sizes less than two microns and preferably below 0.1 micron in average particle size.

The copolymers have molecular sizes from about 20,000 to 1,000,000 or more, as determined by number-average methods. Below this minimum value the copolymers studied have not provided filaments having adequate strength. There is no sharp upper limit.

The apparent second order transition temperature, here symbolized as $T_i$, is defined as that temperature at which the first derivative of thermodynamic variables, such as coefficient of expansion or heat capacity, undergoes a sudden change. The transition temperature is observed as an inflection temperature which is conveniently found by plotting the log of the modulus of rigidity against temperature. A suitable method for determining such modulus and transition temperature is described by Williamson in British Plastics, 23, 87–90. The $T_i$ values here used are generally those temperatures at which the modulus is 300 kg./cm.$^2$. The $T_i$ values referred to are for polymers as such in a dry state unless otherwise designated.

The aqueous dispersions of defined thermoplastic copolymers which are here utilized are obtained by emulsifying at a pH of at least 7 a mixture of monomers, said monomers being monovinylidene compounds polymerizable under the influence of a free radical polymerization initiator, the emulsifying being accomplished with the aid of an anionic or non-ionic emulsifying agent which is sensitive to acid, and polymerizing the emulsified mixture of monomers under the influence of a free radical initiator, preferably in a redox system. There may also be used mixtures of separately formed aqueous dispersions containing an anionic or non-ionic emulsifying agent and polymers having the prescribed apparent second order transition temperature, a linear structure capable of being oriented, polar groups, and sufficient molecular size.

Monovinylidene compounds useful for providing copolymers coming within the above requirements and definitions are taken primarily from one or more of the recognized classes comprising esters, ethers, amides, nitriles, and cyclic compounds providing a $CH_2=C<$ group. The most important esters belong to the acrylic family, as also the nitriles and amides. Thus esters of acrylic acid or methacrylic acid provide particularly desirable comonomers as prepared with aliphatic, cycloaliphatic, aryl, arylaliphatic, and heterocyclic groups from alcohols free of polymerizable unsaturated linkages. Yet there may also be used as one of the comonomers esters of itaconic acid and monohydric alcohols having aliphatic including alkyl, cycloalkyl, aryl, arylaliphatic including benzyl, or heterocyclic residues. Vinyl esters of monocarboxylic acids also can be used, although less favorably, except, perhaps, where one of these esters is used in minor amount and/or hydrolysis of the ester group may be desired. Amides of acrylic and methacrylic acids, especially where there is an N-substituent other than hydrogen, are also of interest as supplying a comonomer having a polar group, particularly one having reactivity toward stabilizing reagents.

Yet another class of useful comonomers comprises vinyl ethers. Almost any alcohol residue which can be utilized in an acrylic ester can appear in a vinyl ether. This offers a number of advantages including that of resistance to hydrolysis at the functional and polar linkage. Other comonomers which can be utilized include vinyl chloride or vinylidene chloride, and to a limited extent styrene and vinyltoluene.

Special mention should be made of nitriles as comonomers. Some of the most satisfactory yarns and filaments have been made from copolymers having a major proportion of acrylonitrile or methacrylonitrile and between 5% and 50% of at least one other polymerizable monovinylidene monomer. The combination of monomers is selected to help develop the various properties desired.

Copolymers can be prepared from any combination of two or more of the above and similar monovinylidene compounds, which yields copolymers which are thermoplastic and soluble and which have the required value of $T_i$. The principle of combining comonomers will be illustrated below with reference to some especially desirable combinations. These are however, not limitations but are illustrative of the kinds of monomers which can be mixed and copolymerized.

Reference will now be made to typical monomers which may be used for forming copolymers. It is not intended to give an exhaustive list but rather a list which suggests specific and typical comonomers for use in preparing the copolymers in dispersions.

An important class, as has been indicated, comprises esters of acrylic acid and α-methacrylic acid. The alcohol residue for forming these esters may take on many forms, such as alkyl, typical of which are methyl, ethyl, propyl, isopropyl, butyl, tert-butyl, sec-butyl, isobutyl, hexyl, 2-ethylhexyl, octyl, 3,5,5-trimethylhexyl, dodecyl, or octadecyl, alicyclic including cyclopentyl, cyclohexyl, methylcyclohexyl, dimethylcyclohexyl, trimethylcyclohexyl, butylcyclohexyl, cyclohexylcyclohexyl, dicyclopentyl, and hexahydrobenzyl, aralkyl typical of which are benzyl, methylbenzyl, dimethylbenzyl, butylbenzyl, phenylethyl, methylphenylethyl, or phenylpropyl, or aryl, such as phenyl, methylphenyl, dimethylphenyl, butylphenyl, or p-diisobutylphenyl, or naphthyl.

The alcohol residue is not confined to hydrocarbon, however, and there may be used groups comparable to the above with other atoms present in addition to carbon and hydrogen, such as halogen, oxygen, nitrogen, or sulfur. Typical alcohol residues of this sort are methoxyethyl, ethoxypropyl, butoxyethyl, octoxyethyl, dodecyloxyethyl, undecenyloxyethyl, benzoxyethyl, methylbenzoxyethyl, cyclohexoxyethyl, trimethylcyclohexoxyethyl, phenoxyethyl, phenoxypropyl, dimethylphenoxyethyl, tert-butylphenoxyethyl, octylphenoxyethyl, and other alkyl, cycloalkyl, aralkyl, and aryl glycol ether residues. In place of these ether groups there may be used comparable thioether groups or mixed oxygen and sulfur ether linkages in polyethers.

Similarly amino nitrogen can appear in the alcohol residue which forms an ester or ether, or other compound. For example, the residue may be N,N-dimethylaminoethyl, N,N-diethylaminoethyl, N,N-dibutylaminoethyl, N,N-dimethylaminopropyl, morpholinoethyl, pyrrolidinoethyl, piperidinoethyl, N-methylpiperazinoethyl, or 3-N,N-dibutylaminopropyl. A special subclass of residues having an amino function includes N-tert-butylaminoethyl, N-tert-butylaminopropyl, N-tert-octylaminoethyl, N-tert-dodecylaminoethyl, and other N-trialkylcarbinylaminoethyl or propyl groups, these having a reactive hydrogen on the nitrogen and supplying a basic function. There should also be mentioned 7-amino-3,7-dimethyloctyl acrylate and methacrylate, which also supplies a reactive hydrogen in the copolymer.

Halogens can also be present, as in chlorobutyl, bromobutyl, chlorocyclohexyl, p-chlorobenzyl, p-chlorophenyl, trichlorophenyl, pentachlorophenyl, dichlorophenoxyethyl, or 1,2,3,4,7,7-hexachloro-2.2.1-bicyclohept-2-enylmethyl.

In place of individual atoms, there may be used groups such as cyano, isocyanate, nitro, ureido, epoxy, hydroxy, or mercapto. Typical alcohol residues having such a group are cyanopropyl, isocyanatoisobutyl, ureidoisobutyl, nitroethyl, nitropropyl, glycidyl, 3,4-epoxybutyl, 4,5-epoxypentyl, 10,11-epoxyundecyl, hydroxyethyl, hydroxypropyl, hydroxypentyl, or mercaptobutyl.

Several heteroatoms may be present in a group as in hydroxyethoxyethyl, hydroxyethylthioethyl, cyanoethoxyethyl, or cyanopropoxyethyl.

Another type of alcohol residue which is effectively used is obtained from heterocyclic alcohols, such as tetrahydrofurfuryl, thenyl, or tetrahydropyranylmethyl, also 4-(2,2-dimethyl)dioxolanylmethyl.

While the above alcohol residues have been shown as typical of those forming esters of acrylic and methacrylic acids and the like, they may also be used to form vinyl ethers, such as vinyl butyl ether, vinyl nitroalkyl ethers, vinyl 5-hydroxypentyl ether, vinyl ureidopentyl ether, vinyl ethoxyethyl ether, vinyl benzyl ether, vinyl dimethylaminoethyl ether, vinyl cyclohexyl ether, or vinyl phenyl ether. Further enumeration seems scarcely necessary, since vinyl ethers can be prepared having alcohol residues quite as diverse as those shown above. Likewise, in place of the oxygen linkage in such ethers, there may be used a sulfur linkage. Several kinds of functional groups may be present in the alcohol residue forming the vinyl ether just as has been indicated in the case of esters.

The various substituents which can be used in alcohol residues for forming esters or ethers are important for varying the properties of copolymers based on the polymerizable esters and ethers. For example, these substituents are polar in nature and supply not only this needed group but may also supply a desired additional hydrophilic quality. They also provide loci at which reaction can be effected in stabilizing or cross-linking reactions with polyfunctional reactants or with copolymers containing several kinds of reactive groups.

Another type of polymerizable vinylidene compound comprises acrylamides and methacrylamides, desirably having at least one N-substituent other than hydrogen, particularly a hydrocarbon group. While unsubstituted acrylamide or methacrylamide can be used, they can be copolymerized emulsions only in small amounts, because they are soluble in aqueous media. The amides and their mono-N-substituted analogues are useful in providing locations within copolymers made therewith at which reaction can take place with other reactive groups. There may be also taken as comonomers disubstituted acrylamides and methacrylamides.

As N-substituents there may be used alkyl, cycloalkyl, aralkyl, or aryl groups, or any of these varied with heteroatoms, as in hydroxyalkyl, alkoxyalkyl, alkylthioalkyl, dialkylaminoalkyl, haloaryl, and so on just as shown above for ethers and esters. Typical compounds are N-methylacrylamide, N-octylacrylamide, N-butylmethacrylamide, N-dodecylacrylamide, N-cyclohexylmethacrylamide, N-(methylcyclohexyl)acrylamide, N-phenylacrylamide, N-benzylacrylamide, N-methyl-N-dodecylacrylamide, N-methyl-N-phenylacrylamide, N,N-dibutylmethacrylamide, N,N-dibenzylacrylamide, morpholinoacrylamide, piperidinomethacrylamide, pyrrolidinoacrylamide, N-methoxyethylacrylamide, N-hydroxyethylmethacrylamide, N-dimethylaminoethylacrylamide, or N-ureidoisobutylacrylamide.

There may also be used as comonomers many other kinds of polymerizable monovinylidene compounds which do not fall exactly within broad classes, such as have been illustrated above, such as N-vinylacetamide, N-vinylcarbazole, N-vinylethyleneurea, 2-methylenebutyrolactone, 2-isopropenyl-4,4-dimethyloxazoline, 2-methylene-1,3-indanedione, 2-methylene-1,3-dioxolane, N-vinylsuccinimide, N-vinylphthalimide, N-vinylpyrrolidone, 3-methyl-1-vinylpyrrolidone, 3,3,5-trimethyl-1-vinylpyrrolidone, 3- ethyl-1-vinylpyrrolidone, 3-butyl-1-vinylpyrrolidone, or the various vinyl pyridines.

While the copolymers of primary interest are built from monomers illustrated above, there may also be introduced into the copolymer small proportions of alkyl maleates or fumarates, allyl compounds such as allyl acetate, allyl ethyl ether, or allylurea, and other polymerizable ethylenic compounds which tend to polymerize either more slowly than the more reactive polymerizable vinylidene compounds, or give polymers of relatively low molecular sizes. There may also be used in forming copolymers minor amounts of other monomers having appreciable water-solubility, such as acrylic or methacrylic acid, which in the neutral to alkaline emulsions are converted to salt form, but which after coagulation in the acid bath provide active hydrogens.

Instead of the use of monomeric acrylic or methacrylic acid, or other vinylidene carboxylic acid, such as itaconic, there may be taken a polymer thereof in the form of a salt. Units of this polymer are incorporated into the copolymer upon addition of an acrylic ester, amide, nitrile, or other acrylic derivative or of mixtures of these or of mixtures of one or more of these and other polymerizable monovinylidene compound, including any of those shown above. In this way there are formed graft or block copolymers. Other water-soluble polyvinylidenes can be used in the same way, as for example, polyvinylpyrrolidone, polyacrylamide, water-soluble polyvinyl ethers, polyvinyl alcohol, or water-soluble acrylic esters, such as poly(dimethylaminoethyl acrylate).

This same principle may be applied to other polyvinylidene compounds than the water-soluble ones. Solvent-soluble polymers may be dissolved in one or more monomers and block or graft copolymers formed therefrom.

It will be recognized that the various kinds of monovinylidene compounds shown above undergo addition polymerization. The usual copolymers formed are mostly linear in nature. Side chains or branches do not essentially alter the linear nature of the copolymers, although some have contended that branched polymers are not true linear polymers. They are nevertheless thermoplastic polymers, and by this expression distinction is effected over space-network polymers.

Among the copolymers which can be formed from mixtures of two or more monomers, such as shown above, there are some which provide filaments and yarns with exceptionally good properties, particularly as to stability, minimum retraction, and extensibility. These desirable effects are particularly evident when one of the comonomers used to build the macromolecules contains a cycle which is not distant from the chain-forming vinylidene group. The cycle seems to act as a key or block which holds the polymer chain in a relatively fixed spatial relation by its bulk or by its spatial relation to the polymer chain. Groups which have been observed to act in this way include phenyl, methylphenyl, dimethylphenyl, trimethylphenyl, o-tert-butylphenyl, trichlorophenyl, pentachlorophenyl, methylchlorophenyl, naphthyl, benzyl, methylbenzyl, phenylethyl, phenoxyethyl, phenoxypropyl, methylphenoxyethyl, dimethylphenoxyethyl, octylphenoxyethyl, phenoxyethoxyethyl, phenoxyethoxyethoxyethyl, diisobutylphenoxyethyl, benzoxyethyl, cyclohexoxyethyl, cyclohexoxyethoxyethyl, cyclohexyl, butylcyclohexyl, 3,3,5 - trimethylcyclohexyl, 2,4,6 - trimethylcyclohexyl, 4-methylcyclohexyl, dicyclopentyl, cyclopentyl, methylcyclopentyl, isobornyl, hexahydrobenzyl, 1,2,3,4,7,7-hexachloro-(2.2.1)bicyclohept - 2 - enylmethyl, tris(dimethylaminomethyl)phenyl, 4-(2 - phenylpropyl)-phenyl, 4-(2-phenylpropyl)phenoxyethyl, endomethylene cyclohexylmethyl, and other groups having an aromatic or alicyclic ring not more than eleven atoms removed from the vinylidene group.

The ring need not, however, be a carbocycle, for it has been found that polymerizable vinylidene compounds having a heterocycle also supply the bulky group which gives desirable properties to filaments formed from copolymers including such a component group. Thus, the phenothiazyl group, which can be supplied by N-acrylyl phenothiazine, for example, or the benzothiazyl group, which can be supplied, for instance, from benzothiazyl vinyl thioether, are typical heterocyclic radicals suitable for the purpose. There may also be mentioned the desirable influence of rings supplied to copolymers from such heterocyclics as 2-isopropenyl-4,4-dimethyloxazoline, N-vinylsuccinimide, N-vinylphthalimide, N-vinylethyleneurea, or 2-methylene-1,3-indanedione. Still another ring structure can be introduced by acenaphthalene.

In the emulsion polymerization of two or more of the various comonomers discussed above, there is used an emulsifier which is sensitive to acid. One broad class of these comprises anion-active soaps or derivatives thereof, one group of which is composed of alkali metal, ammonium, or amine salts of fatty acids, or of long chained hydroxyalkanoic, epoxyalkanoic, or cyanoalkanoic acids. These true soaps and soap-like products are destroyed when treated with acid resulting in liberation of fatty acid or comparable acid which is insoluble in the aqueous phase. Soaps form a preferred class of emulsifying agents.

There may also be used a group of synthetic soap-like compounds which act as emulsifiers when they are in salt form, but which lose this property when converted to their free acid form or which decompose when converted to their acid form. These are also anion-active agents and include some sulfates and even some sulfonates. Examples are octylphenoxyethyl sodium sulfate and sodium diisobutylphenoxyethoxyethyl sulfate.

Instead of anion-active emulsifiers there may be likewise used non-ionic agents which are sensitive to acid and, therefore, lose their capacity to disperse particles of copolymer when the dispersions formed therewith are rendered acidic. One class of these comprises surface active agents having an acetal linkage in the chain thereof, at which linkage the molecule can be disrupted upon treatment with acid. Dr. P. L. deBenneville et al. have made a number of types of this class. There are, for example, the polyethers of the structure

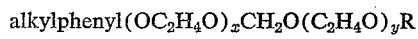

where $x$ is an integer from one to three, $y$ is an integer from four to about sixty, and R is a hydrocarbon group of one to seven carbon atoms, including alkyl, alkenyl, benzyl, and phenyl groups. The indicated alkyl group can vary from six to eighteen carbon atoms. Instead of an alkylphenyl group in this type of product, there may be used to supply the hydrophobic portion an alkyl group of eight or more carbon atoms, preferably one of twelve to twenty-four carbon atoms. Another type of acid-sensitive emulsifier has a structure

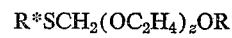

where R* is an alkyl group of eight to twenty-four carbon atoms, $z$ is an integer from eight to about 60 and R is a hydrocarbon group such as methyl, butyl, allyl, phenyl or benzyl. Yet another type is that of the formula

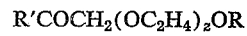

where R′ is a hydrocarbon group of seven to 24 carbon atoms and $z$ and R are as above.

The methylene linkage is supplied by chloromethylation of one substituent part of the above molecules and reaction of the chloromethylated part with the other part in a hydroxy compound in the presence of an alkaline agent for taking up HCl. Thus, a long-chained carboxylic acid, such as lauric, stearic, or abietic, or a long-chained mercaptan, is chloromethylated with HCl and formaldehyde (or the equivalent chloromethyl ethers), and the chloromethylated product reacted with a monoether of a polyethylene glycol in the presence of sodium hydroxide. These reactions are carried out at low to moderate temperatures.

The effective emulsifiers for use in the process of this invention can be determined by the following test. An aqueous solution of the proposed emulsifier is made and titrated into a dilute acid solution until a turbidity end point is reached which prevents the reading of newsprint therethrough. The solution of proposed emulsifier is made at 5% concentration. As acid, sulfuric acid is used at 10% concentration, percentages being by weight. A portion of 25 ml. of the 10% acid solution is placed in a standard 100 ml. beaker and stirred while the 5% emulsifier solution is slowly added until turbidity prevents the reading of newsprint under the beaker when viewed vertically. If not over three ml. of emulsifier solution has been added at the turbidity end point, the emulsifier will be satisfactory for the acid spinning process of this invention and the term "acid sensitive emulsifier" when used in the claims is meant to refer to emulsifiers which are determined to be satisfactory by this test.

In this test a turbidity end point of 0.1 ml. was found for sodium epoxystearate and sodium oleate, of 0.3 ml. for potassium laurate and coconut oil soap, of 0.2 ml. for a medium titer sodium soap, and of 2.5 ml. for diisobutylphenoxyethoxyethyl sodium sulfate, all of these being successfully used in the process of this invention.

The amount of emulsifying agent used may vary from a few tenths percent up to about ten percent of the weight of the comonomers. The agent is usually taken up in water and at least some of the aqueous solution and at least part of the monomers are mixed with agitation. If desired, all of the emulsifier may be present in the starting mixture and part or all of the monomers mixed therewith. A polymerization initiator is supplied and the monomers in emulsion are polymerized, heat being supplied if necessary. Temperatures of polymerization are between 0° and 100° C.

As polymerization initiator there may be used one or more of the peroxidic or the azo initiators, which act as free radical catalysts. Actinic light also acts as a free radical catalyst. Typical organic peroxides include benzoyl peroxide, acetyl peroxide, caproyl peroxide, tetralin peroxide, tert-butyl hydroperoxide, cumene hydroperoxide, diisopropylbenzene hydroperoxide, p-menthane hydroperoxide, phenylcyclohexyl hydroperoxide, tert-butyl perbenzoate, and methyl ethyl ketone peroxide. Typical azo catalysts are azodiisobutyronitrile, dimethyl azodiisobutyrate, and azodiisobutyramide. In aqueous systems ammonium, sodium, or potassium persulfates are also convenient or a combination of persulfate and organic peroxide may be used. The persulfate is generally used in conjunction with a reducing agent, such as an alkali metal sulfite, bisulfite, metabisulfite, or hydrosulfite, to provide a redox system, which will start polymerization at a low or moderate temperature. This combination may be supplemented with a few parts per million of a polyvalent metal, such as iron, to accelerate the reaction. There may also be added an amine, such as diethylenetriamine, triethanolamine, tetraethylenepentamine, or morpholine.

If the full charge of monomers was not emulsified at the start, monomers or monomers and emulsifier may be added to the polymerizing mixture continuously or from time to time. This permits bringing the concentration of copolymer in the dispersion to a high level. Concentrations of at least 20% are necessary and may be as high as that at which reversion may occur. It is preferred to work with dispersions containing 25% to 50% of copolymer. At these concentrations of dispersed copolymer the dispersions are quite fluid. Therein they have great advantage over solutions, which become too viscous to be spun when an attempt is made to carry concentrations into these levels.

There may be incorporated in the dispersions agents for improving spinning and handling, when these are desired. An important class of such agents which we have discovered is here termed "fusion-aids."

Compounds effective for this purpose have solubility in the polymer and have a favorable distribution coefficient toward polymer in a polymer-water system. The nature or structure of a fusion-aid will vary with the particular copolymer being used. A compound which is a good fusion-aid for one kind of copolymer may not be a fusion-aid for a different kind of copolymer. Suitability of a proposed fusion-aid can, however, be determined in a simple test.

Since a fusion-aid must be a solvent for a given copolymer, it is first of all examined for its solubilizing action. A portion of 0.5 gram of copolymer is taken up in 25 ml. of the proposed fusion-aid. If the copolymer fails to dissolve, the liquid under examination is obviously not a fusion-aid. If the copolymer dissolves, it must not be precipitated from solution upon addition of water to the solution. Thus, 5 ml. of water is added to the above solution, the resulting mixture is stirred for about five minutes, and the stirred mixture is left standing for 15 minutes. If layers form without precipitation of polymer, the liquid under examination can be used as a fusion-aid. It is preferred that fusion-aids boil below about 400° C. Thus, a fusion-aid is a solvent for the copolymer which remains dissolved within the copolymer in the presence of water.

To illustrate the selection of organic liquids as fusion-aids there is cited a case wherein there was prepared a dispersion of a copolymer of 75 parts by weight of acrylonitrile and 25 parts of 3,3,5-trimethylcyclohexyl acrylate. Solid polymer was separated by freeze-drying. It was washed with water to remove soap and other water-soluble components. Residual monomers were removed with benzene-denatured ethanol. The copolymer was then dried to constant weight under reduced pressure at about 30° C. One-half gram portions were added to 25 ml. of a variety of organic liquids. The copolymer was soluble in dimethylformamide, adiponitrile, $\beta,\beta'$-dicyanoethylamine, dimethylsulfolane, $\alpha$-methylsuccinonitrile, and nitromethane. It was insoluble, for example, in 90% formic acid, which was thereby ruled out as a possible fusion-aid.

To each of the solutions of copolymer was added a 5.0 ml. portion of distilled water. The resulting mixture was stirred for five minutes and allowed to stand for 15 minutes. Polymer was precipitated immediately after addition of water to the dimethylformamide solution. It would not be expected then to be a fusion-aid. Actual trials of spinning by procedures described below showed that this compound was not of value when present in the copolymer. Solid copolymer precipitated from the solution in $\beta,\beta'$-dicyanoethylamine. It, too, was shown not to be a fusion-aid for this particular copolymer. This was also true for dimethylsulfolane, from which polymer was precipitated. On the other hand, adiponitrile, $\alpha$-methylsuccinonitrile, and nitromethane were found of value as spinning aids, and as solvents. Their solutions did not precipitate polymer upon addition of water.

Also found effective as fusion-aids for polymers formed in major proportion from acrylonitrile or methacrylonitrile were phenylacetonitrile, butyronitrile, hexanenitrile, N-methylsuccinonitrile, acrylonitrile or methacrylonitrile monomers, endomethylenetetrahydrobenzonitrile, succinonitrile, benzonitrile, isobutyronitrile, and furonitrile.

When the nature of the copolymer is varied by choice of different comonomers, the choice of organic liquids may also vary. Thus, for copolymers based upon several acrylic esters fusion-aids must be selected which are solvents therefor and which will hold the copolymers in solution in the presence of water.

To illustrate this point a copolymer was prepared in emulsion form from 87 parts of methyl methacrylate and 13 parts of ethyl acrylate. Solid polymer was separated as above. Portions of 0.5 gram each were added to 25 ml. each of a series of organic liquids. This copolymer was insoluble in adiponitrile and adiponitrile was found of no value in spinning. The copolymer was soluble in ethoxyethanol, dioxane, and dibutyl phthalate, but was precipitated from these solvents. They were found to be of no assistance as spinning and were not fusion-aids. The copolymer was soluble in toluene, xylene, chlorinated hydrocarbons, ethyl acetate, and butyl acetate and was not precipitated from solutions therein. These liquids were all of value in forming fibers by the process of this invention and were, therefore, fusion-aids.

As a practical matter it is preferable that the organic liquids selected as fusion-aids have boiling points above the temperature of the coagulating bath. Also, they should be volatile under the temperature conditions within which the filaments or films are processed, although they need not boil below these processing temperatures.

There may be incorporated as a fusion-aid from 1% to 40% by weight of one or more organic liquids meeting the above requirements, the percentage being based on the weight of the copolymer. Usually the weight of fusion-aid, if used, will be from 10% to 20% of the weight of copolymer. In some cases the fusion-aid can be added to one or more of the comonomers provided that the presence of the chosen organic liquid does not interfere with polymerization. In some cases a fusion-aid can be directly added to the dispersion of copolymer. This step can be taken if addition of organic liquid does not cause coagulation of the dispersion of copolymer. A way around this undesired phenomenon is to emulsify the organic liquid and add the resulting emulsion to the dispersion of copolymer.

Since the aqueous dispersion of thermoplastic, linear copolymer even at concentrations of 25% to 65% is relatively nonviscous and fluid it can be passed through an orifice without use of the pressures required to drive viscous solutions or to exude melts through the conventional spinnerettes used for forming fibers and yarns. The device used for shaping filament or film may have a single opening or multiple openings, which may be round, elliptical, or slotted. It is fed with the dispersion to be spun conveniently by a constant pressure or constant displacement method, as by an oil ram. Gear pumps are suitable for direct use only when the dispersions have a high degree of stability and resistance to mechanical shear.

Under normal spinning conditions the rates of flow through the opening orifice or spinnerette are below those at which turbulence would be encountered. The pressure drop across the opening is less than one pound per square inch for the aqueous dispersions of copolymers. Measurements for dispersion having about 50% copolymer solids are actually 0.2 to 0.3 pound per square inch pressure drop across orifices.

The orifice, jet, or spinnerette is placed in direct contact with the coagulating bath and the aqueous dispersion is passed therethrough into the coagulating bath. As the dispersion enters this bath, it forms a more or less continuous, shaped structure, which at this point tends to be somewhat spongy.

The coagulating bath is an aqueous bath containing sufficient acid and acid of sufficient strength to maintain the pH of the bath below a value of about 4 and preferably below a pH value of one. Buffer salts can be used such as sodium dihydrogen phosphate, which gives a pH of 4.1, but in this process the action of the coagulating bath does not depend upon a high electrolyte content and resulting dehydration, but rather upon inactivation of emulsifier by hydrogen ions.

The bath can contain from about one-half percent of a hydrogen-supplying compound upwards, 98% sulfuric acid having been successfully used, although without advantage. The coagulating bath preferably contains about 1% to 10% of a water-soluble acid. There may be used an inorganic or an organic acid, including hydrochloric, phosphoric, sulfuric, oxalic, formic, acetic, citric, or lactic, or an alkanesulfonic or arylsulfonic acid, such as ethanesulfonic or toluenesulfonic, or mixtures of such acids, or mixtures of water-soluble acids and acid-buffering salts, or just an acid-buffering salt itself. As acid is consumed or carried out of the bath, it is replaced to maintain the desired range of pH.

In some coagulating baths it is helpful to have present in addition to the acid a small amount of a water-soluble salt of a polyvalent metal. For example, in baths containing hydrochloric acid it is helpful to have present from 0.05% to 1% of ferric chloride or ferric sulfate or other soluble polyvalent metal salt. In place of a soluble ferric salt there may be used an aluminum, zirconium, tin, cobalt, nickel, or zinc salt. The presence of metal ions has been noted as particularly helpful when a multiple opening orifice is used.

The coagulating bath is maintained at a temperature above the $T_i$ value of the solvated copolymer in the bath. The temperature of the aqueous dispersion fed to the orifice is usually between 20° and 50° C. The bath temperature is usually from 50° to 105° C. Copolymers with higher $T_i$ values should be passed through coagulating baths at relatively higher temperatures than those with lower $T_i$ values, although the $T_i$ of the solvated, coagulated copolymer at this point, particularly when a fusion-aid is present, will be considerably below the $T_i$ of the dry copolymer itself.

The important consideration is that for any given copolymer and the particular aqueous dispersion thereof the particles issuing from the jet or orifice be coagulated in a desired form which has sufficient strength for further handling. This may require immersion in the bath for longer or shorter times, depending upon the nature of the copolymer, the aqueous dispersion, and the bath. The length of travel in the bath is but one consideration and may vary from about an inch to several feet. Coagulation also is influenced by concentration of acid, temperature, and rate of formation of product. Coagulation occurs very rapidly and at or close to the face of the jet or orifice with destruction or inactivation of the emulsifying agent.

The rate of formation of filament, yarn, or film may vary from about one to 50 or more meters per minute and is sufficient to prevent premature coagulation within the opening of the jet or orifice. The freshly formed product is drawn through the bath under slight tension.

The jet, orifice, or spinnerette used for shaping the coagulate is normally less than about 0.025 inch in diameter or in the smaller dimension, if the opening is elliptical or rectangular. Usually the opening or openings of a spinnerette are from 2 to 5 mils in cross section.

From the coagulating bath the shaped filaments or films may be taken to a washing chamber, where they are rinsed with water or neutralized to remove free acid or salts on their surface. Washing, however, is not here essential and it may be omitted or it may be replaced with a treating bath, as when it is desired to supply a substance which reacts with copolymer at reactive functional groups thereof. Where a volatile acid is used, washing becomes less essential, whereas with a non-volatile acid or acid salts washing becomes desirable.

Whether the shaped object is washed or not, it is passed to a drying zone where water is driven off. This is ususally accomplished by passing the shaped object through a zone at a temperature between 60° and 400° C., preferably at 100° to 250° C., the optimum temperature level being determined by the nature of the copolymer used, the particular object being dried, the type of apparatus used, the rate of passage through the heating zone, and also the subsequent steps, if any, through which the shaped object will pass.

During the drying operation coalescence of particles in the shaped object, which was started in the coagulating bath, continues. As water leaves the shaped products, powerful surface tension forces come into play. These draw particles together and a sort of fusion takes place without melting, i.e. fuse-drying.

Either during the drying operation or thereafter the shaped object is carried to a sufficiently high temperature to carry the shaped object above the $T_i$ value of the copolymer. As the copolymer is heated to temperatures at which water is driven off, together with other volatile materials, such as fusion-aids, the observable $T_i$ value increases to about the $T_i$ value for the dry copolymer in question. The temperature of the shaped object is carried above this value but it is not carried to a point at which degradations or thermal mutations (i.e. evident changes in degree of polymer size or decomposition caused by heat) would occur. Usually a temperature is reached within the shaped object which is at least 30° C. above the $T_i$ of the dry copolymer.

Under these conditons there is effected sufficient coalescence of particles to give good cohesion, and some strength. Some retraction in yarn, filament, or film may occur unless tension is applied thereto.

Drying and joining of particles in the way described may be accomplished in one operation or in several steps. Generally, it is most convenient to bring about these effects in a single zone in which the temperature is high enough to promote coalescence as well as drying and the time is sufficient to allow these actions to proceed satisfactorily. The over-all operation here is best described by the term "fuse-drying."

After fuse-drying it is necessary to stretch the filament, yarn, or foil. Stretching is carried-out usually at a temperature between 70° and 300° C. for the shaped object. The temperature of the environment may be and generally is higher. The material in this temperature range can be passed over godet wheels or rollers with differential peripheral speeds to promote stretching of 50% to 2000%, preferably of 700% to 1200%. Where very low deniers are wanted, the stretching is relatively great. As the stretched product leaves the apparatus for stretching, it is normally cooled. When the $T_i$ value is above the temperature reached with cooling, the degree of stretching reached in the drawing is substantially retained. If further processing is to follow the stretching operation, a cooling step is not essential. The stretched yarn, filament, or film may be passed directly to the additional step or steps or the stretched material may be wound on a bobbin or spool or cut into staple fibers.

There are many applications where filaments, threads, or yarns produced by the essential steps of passing a defined aqueous dispersion of copolymer into an acidic coagulating bath, and fuse-drying the shaped product can be used in the state provided by just these steps. They may be used, for filter cloths, rainwear, upholstery, and coated sheets. Also they may be used in the manufacture of carpets, rugs, crepe goods, and non-woven fabrics.

The filaments, threads, yarns, or films here prepared may be subjected to conventional finishing steps. They may also be treated chemically at reactive groups thereof, particularly with polyfunctional reagents which can react at two or more positions of the shaped object. As a result of such reaction, the shaped structure is stabilized through chemical attachment and chemical forces.

In order to react the shaped product with a reagent there must be present in or on it chemically reactive groups at which combination with the reagent, desirably a polyfunctional reagent, can take place without destruction of the shaped product or without such loss of orientation or with such blocking of orientation that the product fails to hold or develop strength. When the epoxy group, for example, is present in the copolymer of the shaped product, reaction of this group and groups supplying an active hydrogen takes place at relatively low temperatures and without danger of loss of orientation. If the shaped copolymer contains carboxyl or hydroxyl groups, there should be used a polyfunctional reagent of good reactivity for these so as to avoid an excessive temperature, that is one at which loss of orientation or even depolymerization would occur.

There may also be present and used other functional groups in the copolymer, such as amido, ester, carbamate, unsaturated azlactone, anhydride, methylene halide, acyl halide, amino, isocyanato, or other reactive group. A polyfunctional reagent having complementally reactive substituents is then applied to the copolymer and reacted therewith. The reagent may be applied from a solution or from a melt or, if a liquid, directly. If necessary, reaction may be completed by heating, temperatures from 50° to 200° C. being applicable for this purpose.

The reagents used may thus depend upon such reactive groupings as isocyanato, isothiocyanato, amino, hydroxyl, sulfhydryl, amido, carboxy, epoxy, or aldehydo. Two or more reactive groups must be present in a given reagent to produce cross-linking, except where a given group or reagent reacts polyfunctionally. The reagent may be monomeric or polymeric. It is desirable to have several or more atoms separate the reactive functional groups and the reagents are peculiarly effective when the reactive groups occur in side chains or branches, since this arrangement leads to a hgih degree of flexibility and adjustment of reagent to the active sites of the shaped products.

In the reaction of reagent and shaped product there are three stages at which the two may be brought together. The dispersed polymeric material may be spun or shaped with coagulation, fuse-dried, heat-stretched, and then treated with a reagent with subsequent drying and curing. Again, the polymeric material may be spun or shaped with coagulation, fuse-dried, treated with an external reagent, then heat-stretched and cured. In a third method the polymeric material is spun or shaped with coagulation, treated with external reagent, fuse-dried, heat-stretched, and cured.

When the shaped product is in a state of high molecular orientation, diffusion of reagent into the shaped product is apt to be slow. If a swelling agent or excess heat is used to increase rate of diffusion, the shaped product may lose much of its orientation. On the other hand, if substantial cross-linking occurs through reagent and shaped product being reacted at an early stage, orientation may become difficult. Premature cross-linking may be delayed or inhibited by such means as rapid fuse-drying and/or heat-stretching, use of a volatile inhibitor (e.g. water in reactions involving condensation), a latent catalyst, an induction period, or a volatile inhibitor for controlling the catalyst where a catalyst is used to promote reaction of reagent and shaped product.

Where the reagent to be used is water-soluble, aqueous solutions of 1% to 70% of reagent are conveniently used for treating the shaped product. The concentration selected depends on the particular reagent, the nature of the reactive groups of the shaped product, and conditions of treatment. The treating solution may be used at 20° to 100° C. for times between a few minutes and some hours. Sometimes it is sufficient to pass the product through the solution; again, the product may be soaked in the solution; again, molten reagent may be used.

The solution may include a catalyst for promoting reaction with the shaped product. There may be used, for example, an ammonium salt, as ammonium chloride, thiocyanate, or phosphate, which promotes reaction of active hydrogens as in hydroxyl groups or ureido groups and such substances as polymethylol ureas, dimethylol ethylene urea, dimethylol ethylene thiourea, polymethylol melamines, dimethylol uron, dimethylol triazone, and the methyl ethers of these methylol compounds. Likewise, polymethylol derivatives of amides of polycarboxylic acids may be used. The amount of catalyst may be from 0.5% to 10% of the weight of the reagent used. There are, of course, other combinations of reactive groups than the above which benefit from use of a catalyst.

When solvent-soluble reagents are used, including reagents which are water-sensitive, the reagent may be dissolved in an organic solvent which does not attack or appreciably swell the shaped product or it may be applied directly, if it be a liquid. Hydrocarbons, such as naphtha, are generally useful to dilute reagents and aid in their application. There may also be used alcohols, or ethers, or other common solvents when these do not rapidly swell the shaped product. There may thus be applied such reagents as diisocyanates, including hexamethylene diisocyanate or diisothiocyanate, decamethylene diisocyanate, phenylene diisocyanate, propylene diisocyanate, butylene diisocyanate, phenylene diisothiocyanate, triisocyanatobutane, triisocyanatobenzene, etc. Polycarboxylic acids, their anhydrides, or acid halides may likewise be so used where the shaped products carry functional groups reactive therewith, such substances as succinic acid, pimelic acid, azelaic acid, and sebacic acid and their derivatives being of interest here, as also citric, tricarballylic, and polyacrylic acids and derivatives.

Polyamines such as ethylenediamine, propylenediamine, diethylenetriamine, triethylenetetramine, tetraethylenepentamine, and other polyalkylenepolyamines, may be used in aqueous solution, solvent solution, or as such to treat products having groups reactive with amino groups. Reaction of polyamines with such groups as epoxy or carboxyl is readily accomplished.

Shaped products may also be treated with vapors of reagents which react with two or more functional groups of the shaped product. The lower boiling polyamines, such as ethylenediamine, can be used for this purpose. Formaldehyde also acts as a cross-linking agent, although it lacks the chain length and flexibility of the better reagents.

Use of an external reagent is not, however, essential as mutually reactive groups can be present or developed within a copolymer. For example, a copolymer may be made with ureidosubstituents which, when heated, decompose to give isocyanate groups. These are reactive with many types of groups which can be present within a copolymer and which possess reactive hydrogen including ureido groups. Also, two or more aqueous dispersions of different kinds of polymeric products can be mixed, one kind containing a group reactive with a group of the other kind. Reaction between the two occurs only with sufficient temperature and time, thus permitting cross-linking to be completed after heat-stretching.

The reaction between mutually reactive groups in two polymers may be completed by holding the shaped product at a sufficient temperature for a time long enough to ensure reaction between the several kinds of mutually reactive groups. There may thus be used temperatures between 60° and 400° C., preferably 100° to 300° C., for times from about 10 seconds to 10 hours, times depending upon the particular groups used and being in general in an inverse relationship to temperature. It will be noted that under these conditions there can be used a mixture of copolymers, a mixture of a copolymer and a homopolymer, or a mixture of two homopolymers, the dry mixed polymer having a $T_i$ between 30° and 150° C. The last type of mixture is considered to be equivalent to a normal copolymer, particularly since there is established a chemical linking between particles from the mutually reactive chemical groups.

One aspect of this invention then comprises forming at a pH of at least 7 an aqueous dispersion of a first thermoplastic addition polymer which contains one kind of chemically reactive group, forming at a pH of at least 7 a second aqueous dispersion of a thermoplastic addition polymer which contains groups chemically reactive with groups of the first polymer, the two dispersions being compatible with each other, mixing the two dispersions, the particles of both aqueous dispersions being dispersed with aid of acid-sensitive emulsifier, the size of particles being less than two microns, the polymer particles of the mixed dispersion comprising over 20% by weight thereof, and the solid polymer from the mixed dispersion having an apparent second order transition temperature between 30° and 150° C., passing the mixed dispersion through a shaping orifice into an aqueous acid coagulating bath (as above), heating the resulting shaped product between 60° and 400° C. and above the $T_i$ of the mixed polymer, stretching the heated shaped product between 70° and 300° C., and maintaining the product between 60° and 400° C. until reaction has occurred between the several kinds of mutually reactive groups.

*Example 1*

To 200 parts of distilled water at room temperature is added 6 parts of an aqueous solution containing 2% of ferrous sulfate heptahydrate and 4% of the sodium salt of ethylenediaminotetraacetic acid adjusted to pH 4 with 0.5 N sulfuric acid solution. Then 2¼ parts of coconut soap (potassium coconate) is added followed by 0.6 part of sodium formaldehyde sulfoxylate $2H_2O$. The pH of the solution is adjusted to 10.5 with 0.5 N NaOH. A mixture of 70 parts of acrylonitrile and 30 parts of 3,3,5-trimethylcyclohexyl acrylate is added with stirring, and the air above the resulting emulsion is replaced by nitrogen. To the emulsion is now added 0.15 part of phenylcyclohexane hydroperoxide as a 10% solution in toluene. After a short induction period, polymerization starts as evidenced by a sharp temperature rise. The temperature is now controlled by cooling to remain in the range 35° to 40° C. Over 85% conversion to a dispersion of fine particle size (less than 0.1 micron in diameter) is achieved in about ½ hour after addition of the phenylcyclohexane hydroperoxide. The copolymer contained in this dispersion has a $T_i$ of about 120° C.

The dispersion prepared as described above is metered at the rate of 2.8 grams per minute through a spinnerette into a coagulating bath. The spinnerette consists of a platinum alloy. It has a face diameter of 0.5 inch and contains 40 holes each of 0.0025 inch diameter. The coagulating bath is an aqueous solution containing 4.0% hydrogen chloride and 0.6% ferric chloride which is maintained at 86° C. The bundle of filaments formed is drawn through the bath at the rate of about ten meters per minute. The immersion in the bath is three inches. The yarn is washed slightly with water at room temperature and dried in contact with a metal surface at 260° C. It is then passed over rolls revolving at differential speeds to stretch the yarn about 600%. During this operation, the yarn is heated to about 170° C.

The resulting yarn is lustrous and white and has the following properties: denier, 112; tenacity (65% R.H. (relative humidity), 72° F.), 2.9 grams per denier; and extensibility (65% R.H., 72° F.), 15%.

When heated to 150° C. the yarn shrinks about 28%.

*Example 2*

The procedure of Example 1 is followed except after the stretching step the yarn is heated while being maintained in its stretched condition for three minutes at 230° C. The resulting yarn has the following properties: denier, 114; tenacity (65% R.H., 72° F.), 2.9 grams per denier; and extensibility (65% R.H., 72° F.), 30%.

When heated to 150° C. the yarn shrinks about 3%.

*Example 3*

The procedure of Example 1 is followed except that 20 parts of adiponitrile is added to the polymerization charge after the addition of the acrylonitrile and 3,3,5-trimethylcyclohexyl acrylate and before the addition of the phenylcyclohexane hydroperoxide. The presence of the adiponitrile does not alter the rate or extent of the polymerization.

The strength of the yarn drawn from the bath is substantially higher than is the case when no adiponitrile is used as in Example 1.

The resulting yarn has the following properties: denier, 121; tenaciy (65% R.H., 72° F.), 2.8 gram per denier; and extensibility (65% R.H., 72° F.), 18%.

When heated to 150° C. the yarn shrinks about 30%.

*Example 4*

The procedure is the same as in Example 3 except the yarn is heated while held at constant length for 15 minutes at 190° C.

The resulting yarn has the following properties: denier, 112; tenacity (65% R.H., 72° F.), 3.6 grams per denier; and extensibility (65% R.H., 72° F.), 32%.

When heated to 150° C., the yarn shrinks only about 5%.

*Example 5*

The procedure is the same as in Example 4 except that the coagulating bath is aqueous 8% phosphoric acid, the amount of stretch is about 700%, and the stretched yarn is heated 3 minutes at 225° C. The resulting yarn has the following properties: denier, 102; tenacity (65% R.H., 72° F.), 2.9 grams per denier; and extensibility (65% R.H., 72° F.), 24%.

When heated to 150° C., the yarn shrinks 10%.

*Example 6*

The procedure is the same as in Example 4 except that the coagulating bath is aqueous 4% oxalic acid. The resulting yarn has the following properties: denier, 110; tenacity (65% R.H., 72° F.), 3.1 grams per denier; and extensibility (65% R.H., 72° F.), 28%.

When heated to 150° C. the yarn shrinks 7%.

*Example 7*

The procedure is the same as in Example 4 except that the adiponitrile is added as a 30% emulsion in water after the polymerization is complete. Yarn properties are substantially the same as in Example 4.

*Example 8*

The proceduce is the same as in Example 4 except α-methylsuccinonitrile is added with the monomers instead of adiponitrile. Yarn properties are substantially the same as in Example 4.

*Example 9*

The procedure is the same as in Example 4 except an equal weight of nitromethane is added with the monomers instead of adiponitrile. Yarn properties are substantially the same as in Example 4.

*Example 10*

The procedure is the same as in Example 4 except phenylacetonitrile is added with the monomers instead of adiponitrile. Yarn properties are substantially the same as in Example 4.

*Example 11*

The procedure is the same as in Example 7 except that 20% of methacrylonitrile (based on monomer charge) is added as a 30% emulsion in water after the polymerization is essentially completed. Yarn properties are substantially the same as in Example 4.

*Example 12*

The procedure is like that of Example 4 except that 10 parts of succinonitrile (based an monomer charge) is added with the monomers instead of the adiponitrile. Yarn properties are substantially the same as in Example 4.

*Example 13*

The dispersion prepared as desribed in Example 1 is forced by air pressure through a glass capillary approximately 2 inches long and 0.009 inch inside diameter the tip of which is held below the surface of an aqueous 5% citric acid bath at 90° C. The rate of flow of the emulsion through the capillary is about 0.2 gram per minute. The filament formed is drawn from the capillary at the rate of about 10 meters per minute, dried without washing at 250° C., and stretched about 600% at 150° C. The resulting filament has the following properties: tenacity (65% R.H., 72° F.), 2.5 grams per denier; and extensibility (65% R.H., 72° F.), 23%.

*Example 14*

The procedure is the same as in Example 13 except there is used an aqueous 0.5% citric acid bath instead of the 5% citric acid bath. Filament properties are substantially the same as in Example 13.

*Example 15*

The procedure is the same as in Example 13 except aqueous 5% p-toluene sulfonic acid solution is used instead of the 5% citric acid bath. Filament properties are substantially the same as in Example 13.

*Example 16*

The procedure is the same as in Example 13 except that aqueous 5% acetic acid is used instead of 5% citric acid as the coagulating bath. Filament properties are substantially the same as in Example 13.

*Example 17*

The procedure is the same as in Example 13 except that aqueous 5% formic acid is used instead of 5% citric acid as the coagulating bath. Filament properties are as follows: tenacity (65% R.H. 72° F.), 3.7 grams per denier; and extensibility (65% R.H. 72° F.), 18%.

*Example 18*

The procedure is the same as in Example 13 except that aqueous 1% acetic acid is used instead of 5% citric acid as the coagulating bath. Filament properties are substantially the same as in Example 13.

*Example 19*

The procedure is the same as in Example 13 except that aqueous 1% formic acid is used instead of 5% citric acid as the coagulating bath. Filament properties are substantially the same as in Example 13.

*Example 20*

The procedure is the same as Example 13 except aqueous 5% lactic acid is used instead of 5% citric acid as the coagulating bath. Filament properties are substantially the same as in Example 13.

*Example 21*

The procedure is the same as in Example 13 except aqueous 5% tartaric acid is used instead of 5% citric acid as the coagulating bath. Filament properties are substantially the same as in Example 13.

*Example 22*

The procedure is the same as in Example 13 except aqueous 5% fumaric acid is used instead of 5% citric acid as the coagulating bath. Filament properties are substantially the same as in Example 13.

*Example 23*

The procedure is the same as in Example 13 except aqueous 5% malonic acid is used instead of 5% citric acid as the coagulating bath. Filament properties are substantially the same as in Example 13.

Example 24

The procedure is the same as in Example 13 except aqueous 5% succinic acid is used instead of 5% citric acid as the coagulating bath. Filament properties are substantially the same as in Example 13.

Example 25

A dispersion is prepared as described in Example 3 except that 5 parts of the sodium salt of 9, 10-epoxystearic acid is used instead of 2¼ parts of coconut soap and a mixture of 65 parts of acrylonitrile and 35 parts of p-tert-octylphenoxyethyl vinyl ether is used in place of the 70 parts of acrylonitrile and 30 parts of 3,3,5-trimethylcyclohexyl acrylate. The copolymer contained in this dispersion has a $T_1$ of about 120° C. The resulting latex is spun, dried, and stretched as described in Example 1 except that the degree of stretch is about 900%. The stretched yarn is heated while being maintained in its stretched condition for 15 minutes at 190° C. The resulting yarn has the following properties: denier, 84; tenacity (65% R.H., 72° F.), 2.5 grams per denier; and extensibility (65% R.H., 72° F.), 28%.

When heated to 150° C. the yarn shrinks only about 3%.

Example 26

A dispersion is prepared as described in Example 3 except that a mixture of 60 parts of acrylonitrile and 40 parts of p-tert-octylphenoxyethyl acrylate is used in place of the 70 parts of acrylonitrile and 30 parts of 3,3,5-trimethylcyclohexyl acrylate. The copolymer contained in this dispersion has a $T_1$ of about 100° C. The resulting dispersion is spun, dried, and stretched as described in Example 1 except that aqueous 4% phosphoric acid is used instead of the 4% hydrogen chloride and 0.6% ferric chloride coagulating bath. The stretched yarn is heated while being maintained in its stretched condition for 17 minutes at 175° C. The resulting yarn has the following properties: denier, 144; tenacity (65% R.H., 72° F.), 2.2 grams per denier; and extensibility (65% R.H., 72° F.) 22%.

When heated to 150° C. the yarn shrinks only about 2.5%.

Example 27

A dispersion is prepared as described in Example 3 except that 4.5 parts instead of 2.25 parts of coconut soap is used as the emulsifier and a mixture of 80 parts of acrylonitrile and 20 parts of 2-acryloxynorcamphane (the acrylic acid norcampanyl ester) is used in place of the 70 parts acrylonitrile and 30 parts of 3,3,5-trimethylcyclohexyl acrylate. The copolymer contained in this dispersion has a $T_1$ of about 105° C. The resulting dispersion is spun, dried, and stretched as described in Example 1. This uncured yarn has the following properties: tenacity (65% R.H., 72° F.), 3.0 grams per denier; and extensibility (65% R.H., 72° F.), 15%.

Example 28

A latex is prepared as described in Example 3 except that 3 parts of the sodium salt of 9,10-epoxystearic acid is used instead of 2.25 parts of coconut soap as the emulsifier and a mixture of 70 parts of acrylonitrile, 20 parts of 2-n-butoxyethyl acrylate, and 10 parts of N-isopropenyl-4,4-dimethyloxazoline is used as the nomoner charge.

The resulting latex is spun by capillary as described in Example 13. The stretched filament is heated while being maintained at constant length for one hour at 130° C. The resulting filament has the following properties: denier, 15; tenacity (65% R.H., 72° F.), 2.9 grams per denier; and extensibility (65% R.H., 72° F.), 15%.

On heating to 150° C. the filament shrinks about 24%.

Example 69

The same procedure is used as in Example 28 except that a mixture of 70 parts of acrylonitrile and 30 parts of 5-acryloxy - 3a,4,7,7a - tetrahydro-4,7-methanoindene is used as the monomer charge and the stretched filament is heated at constant length for 15 minutes at 190° C.

Filament properties are as follows: denier, 17; tenacity (65% R.H., 72° F.), 2.0 grams per denier; and extensibility (65% R.H., 72° F.), 35%.

When heated to 150° C. the filament shrinks about 12%.

Example 30

The same procedure is used as in Example 28 except that a mixture of 70 parts of acrylonitrile and 30 parts of isobornyl acrylate is used as the monomer charge and the stretched filament is heated at constant length for 10 minutes at 200° C. The resulting filament has the following properties: denier, 14; tenacity (65% R.H., 72° F.), 2.0 grams per denier; and extensibility (65% R.H., 72° F.), 10%.

When heated to 150° C., the filament shrinks about 20%.

Example 31

A dispersion is prepared as described in Example 3 except that 4.5 parts instead of 2.25 parts of coconut soap is used as the emulsifier and a mixture of 75 parts of acrylonitrile, 15 parts of 3,3,5-trimethylcyclohexyl acrylate, and 10 parts of methyl methacrylate is used instead of 70 parts acrylonitrile and 30 parts 3,3,5-trimethylcyclohexyl acrylate. The copolymer contained in this dispersion has a $T_1$ of about 110° C.

The resulting latex is spun, dried, and stretched as described in Example 1. The stretched yarn is heated while being maintained in the stretched condition for 20 minutes at 190° C. The resulting yarn has the following properties: denier, 112; tenacity (65% R.H., 72° F.), 2.2 grams per denier; and extensibility (65% R.H., 72° F.), 25%.

When heated to 150° C. the yarn shrinks only about 5.5%.

Example 32

A dispersion is prepared as described in Example 1 except that 3 parts of potassium laurate is used as the emulsifier instead of 2.25 parts of coconut soap and a mixture of 57 parts of methyl methacrylate and 43 parts of ethyl acrylate is used instead of 70 parts of acrylonitrile and 30 parts of 3,3,5-trimethylcyclohexyl acrylate. The copolymer contained in this dispersion has a $T_1$ of about 45° C.

The resulting dispersion is spun, dried, and stretched as described in Example 1, except that the drying temperature is 145° C. and the stretching temperature is 110° C. The resulting yarn has the following properties: denier, 160; tenacity (65% R.H., 72° F.), 1.0 gram per denier; and extensibility (65% R.H., 72° F.), 58%.

Example 33

A dispersion is prepared as described in Example 1 except that 3 parts of potassium laurate is used as the emulsifier instead of 2.25 parts of coconut soap and a mixture of 87 parts of methyl methacrylate and 13 parts of ethyl acrylate is used instead of 70 parts of acrylonitrile and 30 parts of 3,3,5-trimethylcyclohexyl acrylate. The copolymer contained in this dispersion has a $T_1$ of about 73° C.

The resulting dispersion is spun, dried, and stretched as described in Example 1 except that the drying temperature is 145° C. and the stretching temperature is 120° C. The resulting yarn has the following properties: denier, 144; tenacity (65% R.H., 72° F.), 1.0 grams per denier; and extensibility (65% R.H., 72° F.), 10%.

Example 34

The same procedure is followed as in Example 33 except 20 parts of toluene emulsified in 40 parts of water is added to the latex after the polymerization is substantially complete. (Toluene passes the "fusion-aid" test.) The yarn coming from the spinnerette is stronger than yarn at this point as prepared in Example 33.

The resulting yarn has properties similar to those given in Example 30.

Example 35

An emulsion is prepared as in Example 1, except that the monomer charge comprises 55 parts of acrylonitrile and 45 parts of n-butoxyethyl acrylate instead of 70 parts of acrylonitrile and 30 parts of 3,3,5-trimethylcyclohexyl acrylate and 5 parts of the non-ionic emulsifier represented by the following formula is used instead of the potassium coconate:

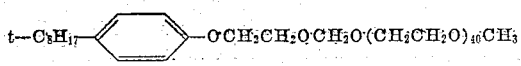

$$t-C_8H_{17}-\langle\rangle-OCH_2CH_2OCH_2O(CH_2CH_2O)_{10}CH_3$$

The resulting dispersion is spun by capillary as described in Example 13 to give a filament with the following properties: tenacity (65% R.H., 72° F.), 2.2 grams per denier; and extensibility (65% R.H., 72° F.), 25%.

In place of the above emulsifier there may be used any other of the acid-sensitive non-ionic emulsifiers.

Example 36

A dispersion is prepared as described in Example 3 except that 4.05 parts instead of 2.25 parts of coconut soap is used as the emulsifier and a mixture of 70 parts of acrylonitrile, 20 parts of 3,3,5-trimethylcyclohexyl acrylate, and 10 parts of N-vinyl pyrrolidone is used as the monomer charge instead of 70 parts of acrylonitrile and 30 parts of 3,3,5-trimethylcyclohexyl acrylate. The copolymer contained in this dispersion has a $T_1$ of about 90° C.

The resulting dispersion is spun as described in Example 13 to give a filament which in the stretched state has the following properties: denier, 15; tenacity (65% R.H., 72° F.), 2.6 grams per denier; extensibility (65% R.H., 72° F.), 22%; and moisture regain (75% R.H., 98° F.), 2.0%.

The moisture regain (75% R.H., 98° F.) of yarn prepared as in Example 3 (70:30 acrylonitrile 3,3,5-trimethylcyclohexyl acrylate) is 1.3%.

Example 37

The same procedure is followed as in Example 36 except a mixture of 70 parts of acrylonitrile, 25 parts of 3,3,5-trimethylcyclohexyl acrylate, and 5 parts of 2-(dimethylamino)ethyl vinyl ether is used as the monomer charge. The resulting filament has the following properties: denier, 18; tenacity (65% R.H., 72° F.), 1.9 grams per denier; extensibility (65% R.H., 72° F.), 18%; and moisture regain (75% RH., 98° F.), 1.9%.

Example 38

The same procedure is used as in Example 36 except a mixture of 70 parts of acrylonitrile, 25 parts of 3,3,5-trimethylcyclohexyl acrylate, and 5 parts of 2-(dimethylamino)ethyl methacrylate is used as the monomer charge. The resulting filament has the following properties: denier, 16; tenacity (65% R.H., 72° F.), 1.6 grams per denier; extensibility (65% R.H., 72° F.), 21%; and moisture regain (75% R.H., 98° F.), 1.9%.

Example 39

The same procedure is followed as in Example 36 except a mixture of 70 parts of acrylonitrile, 25 parts of 3,3,5-trimethylcyclohexyl acrylate, and 5 parts of methacrylamide is used as the monomer charge. The resulting filament has the following properties: denier, 30; tenacity (65% R.H., 72° F.), 1.4 grams per denier; extensibility (65% R.H., 72° F.), 12%; and moisture regain (75% R.H., 98° F.), 2.6%.

Example 40

In 200 parts of distilled water at room temperature is dissolved 10 grams of polyvinyl pyrrolidone (3-GA-PVP-283, General Aniline and Film Co., Inc.). The procedure for manufacture of dispersion described in Example 3 is then followed with use of the same weights of materials there used (cf. Example 1) including the addition of 20 parts of adiponitrile, the various ingredients being added to the polyvinyl pyrrolidone solution. The copolymer contained in the dispersion has a $T_1$ of about 120° C.

The resulting dispersion is spun as described in Example 1.

The stretched yarn is heated (cured) while being maintained in a stretched condition for 15 minutes at 190° C. The resulting yarn has the folowing properties: denier, 114; tenacity (65% R.H., 72° F.), 3.1 grams per denier; extensibility (65% R.H., 72° F.), 25%; and moisture regain of uncured yarn, (75% R.H., 98° F.) 2.4%.

When heated to 150° C. the yarn shrinks about 3%.

Example 41

A dispersion is prepared as in Example 40 except that 10 parts of polyacrylamide is dissolved in 200 parts of water prior to the addition of the polymerization ingredients. The resulting latex is spun by capillary as described in Example 13 except that aqueous 4% phosphoric acid at 85° C. is used as the coagulating bath.

The stretched filament is heated while being maintained in the stretched condition for 20 minutes at 190° C. The properties of the filament are as follows: denier, 20; tenacity (65% R.H., 72° F.), 2.8 grams per denier; and extensibility (65% R.H., 72° F.), 22%.

When heated to 150° C. the filament shrinks about 14%. The moisture regain (75% R.H., 98° F.) of the uncured filament is 1.5%.

Example 42

A dispersion is prepared as described in Example 3 except that 3 parts of sodium diisobutylphenoxyethoxyethoxyethyl sulfate is used as the emulsifier instead of coconut soap.

The resulting latex is spun by capillary as in Example 13 to yield a filament which after drying and stretching has the following properties: denier, 19; tenacity (65% R.H., 72° F.), 2.5 grams per denier; and extensibility (65% R.H., 72° F.), 25%.

Example 43

To 280 parts of distilled water at room temperature is added 5 parts of potassium laurate and the pH of the solution is adjusted to 10.5 with aqueous 10% sodium hydroxide solution. To this solution is added with stirring 0.35 part of sodium ethylenediaminotetraacetate, 0.60 part of phenylcyclohexane hydroperoxide, and a mixture of 65 parts of acrylonitrile and 35 parts of 3,3,5-trimethylcyclohexyl acrylate. The activator mixture to be added to this emulsion is prepared as follows: In 10 parts of distilled water under nitrogen is dissolved 1.11 parts of $FeSO_4.7H_2O$. In 10 parts of distilled water under nitrogen (separate from the ferrous sulfate solution) is dissolved 1.78 parts of $Na_4P_2O_7.10H_2O$. The two solutions are mixed. After being well flushed with nitrogen, the suspension of ferrous pyrophosphate is aged at 50° C. for 20 minutes. During this period a slow stream of nitrogen is blown over the surface of the other ingredients which are being stirred in the reaction vessel. After all material is cooled to 0° to 5° C., the iron suspension is poured into the reaction vessel containing monomer, water, emulsifier, and initiator. An ice bath is maintained around the reaction vessel. The temperature of the emulsion rises about 35° C. within a few minutes. After the temperature drops to 35° C., the ice bath is removed. Essentially quantitative yield is realized.

To this dispersion is added with stirring 20 parts of α-methyl succinonitrile emulsified in 40 parts of water.

The latex is then spun into a yarn as described in Example 1. Properties of the stretched yarn are as follows: denier, 90; tenacity (65% R.H., 72° F.), 2.6 grams per denier; and extensibility (65% R.H., 72° F.), 20%.

*Example 44*

A dispersion is prepared as described in Example 1. Eighty parts of this dispersion is mixed with 20 parts of a dispersion prepared by the same procedure but using a monomer charge of 50 parts of acrylonitrile and 50 parts of 2-n-butoxyethyl acrylate. The mixed dispersion is spun as described in Example 1. The strength of the yarn as it comes from the spinnerette is greater than for analogous yarn produced as described in Example 1. Properties of the dried and stretched yarn are as follows: denier, 105; tenacity (65% R.H., 72° F.), 2.5 grams per denier; and extensibility (65% R.H., 72° F.), 22%.

*Example 45*

A dispersion is prepared as described in Example 1 except that a monomer charge of 45 parts of ethyl acrylate, 45 parts of acrylonitrile, and 10 parts of β-ureidoisobutyl vinyl ether is used.

The dispersion is metered at the rate of 2.5 grams per minute through a spinnerette of 0.5 inch face diameter having 40 holes each of 0.005 inch diameter into an aqueous 3% phosphoric acid solution at 60° C. The resulting bundle of filaments is drawn through six inches of bath at the rate of 8 meters per minute, washed with water at 40° C. on a roller, fuse-dried at 125° C., and heat-stretched to give a yarn of 140 denier.

Part of this yarn is wound on a bobbin and soaked for 40 minutes at 40° C. in an aqueous solution containing 12% of the dimethylol derivative of ethylene urea. The soaked yarn is air-dried and heated at 60° C. for 12 hours while it is held at constant length. The resulting yarn shrinks less than 5% at 80° C. A sample of yarn taken before the soaking step exhibited a shrinkage at 80° C. of greater than 70%.

*Example 46*

A dispersion is prepared as described in Example 45 except that the emulsifier is 3 parts of potassium laurate and the monomer charge consists of 45 parts of ethyl acrylate, 45 parts of acrylonitrile, and 10 parts of glycidyl methacrylate.

This dispersion is spun as described in Example 45. A portion of the resulting yarn is soaked while relaxed in an aqueous 6% solution of ethylenediamine at 30° C. for 80 hours at 25° C. The soaked yarn is air-dried, heated at 80° C. for an hour, heated at 125° C. for an hour (yarn during both heatings is held at constant length), washed in aqueous 5% acetic acid solution at 25° C., washed with water, and air-dried.

The treated yarn shrinks about 4% at 80° C.; the untreated yarn shrinks more than 45% at 80° C.

Another portion of this yarn is treated with aqueous 5% hexamethylenediamine solution in the same way. Shrinkage at 80° C. is then about 2%.

Tenacity of the above yarns is about two grams per denier with breaking extensibilities of 30% to 40%.

*Example 47*

A dispersion is prepared as described in Example 46. It is pumped at 2.0 grams per minute through a 40-hole spinnerette with holes each 0.0025 inch in diameter into an aqueous bath containing 4% hydrogen chloride and 0.5% ferric chloride at 65° C. The bundle of filaments formed is drawn through 8 inches of bath at the rate of 7 meters per minute, washed with water at room temperature on a roller, and fuse-dried at 130° C. It is then soaked in an aqueous 10% hexamethylenediamine solution at 20° C. for about 20 seconds, dried at 70° C., heat-stretched at 120° C. to give a yarn of about 160 denier, and cured at 70° C. at constant length for 50 hours. The yarn has a tenacity of about 1.9 grams per denier and an extensibility of 40%. Shrinkage at 100° C. in the relaxed state is about 26%. Yarn made without treatment with the diamine shinks about 70% at 100° C.

*Example 48*

A dispersion is prepared as described in Example 46. It is spun as described in Example 47 except that just prior to the fuse-drying step, the yarn is soaked in aqueous 6% hexamethylenediamine solution at 60° C. for 45 seconds, then fuse-dried at 100° C. for 40 seconds, heat-stretched at 140° C. to a yarn of about 150 denier, and cured at constant length for 50 hours at 70° C. The resulting yarn has a tenacity of about two grams per denier and an extensibility of about 40%. Relaxed shrinkage at 100° C. is about 15% (control 70%).

*Example 49*

A dispersion is prepared as in Example 1 except that 3 parts of the sodium salt of 9,10(10,9)-cyanohydroxystearic acid is used as the emulsifier and the monomer charge is 45 parts of methyl acrylate, 45 parts of acrylonitrile and 10 parts of β-ureidoisobutyl vinyl ether.

This dispersion is spun through a 40-hole spinnerette with 0.0025 inch openings into an aqueous 3% oxalic acid solution at 70° C. at a rate of draw of about 12 feet per minute. The yarn is washed with water and passed through a tower at 200° C. where it is fuse-dried. The dry yarn is stretched about 600% at 165° C. and heated at 170° C. for 9 minutes under a 10 gram tension. During the heat-curing some decomposition of ureido groups to isocyanate groups is believed to occur. The latter react with ureido groups to give cross-linking within the fiber. The resulting yarn has a denier of 100, a tenacity of 1.3 grams per denier, and a breaking extensibility of about 50%. When the yarn is heated at 100° C., it shrinks about 10% as compared to a shrinkage of over 70% for analogous yarn which has not been cured.

*Example 50*

Two dispersions, designated A and B, are prepared simultaneously as follows:

*Dispersion A.*—This dispersion is prepared as in Example 1 except that 3 parts of the sodium salt of 9,10-epoxystearic acid is used as the emulsifier and the monomer charge is 45 parts of ethyl acrylate, 45 parts of acrylonitrile, and 10 parts of β-ureidoisobutyl vinyl ether.

*Dispersion B.*—This dispersion is prepared as in Example 1 except that 4 parts of coconut soap is used as the emulsifier, and diisopropylbenzene hydroperoxide is used instead of phenylcyclohexane hydroperoxide as the initiator, and the monomer charge is 45 parts of ethyl acrylate, 45 parts of acrylonitrile, and 10 parts of β-isocyanatoisobutyl vinyl ether.

After the polymerizations are substantially complete, equal weight portions of dispersions A and B are immediately mixed and forced by air pressure through a glass capillary 0.009 inch in diameter into an aqueous 3% solution of hydrogen chloride at 70° C. The filament formed is fuse-dried 10 seconds at 150° C. and stretched about 500% at 130° C. The filament is then heated under a tension of 0.1 gram per denier at 170° C. for 10 minutes. The resulting filament shrinks less than 15% at 100° C. as compared to a shrinkage for an analogous uncured filament of over 50%.

It is postulated that in this case, isocyanate groups present in dispersion B react with ureido groups in dispersion A after the two types of polymers are brought together as the water of the dispersion mixture is removed in drying. As long as water is present, the particles containing one type of reactive group are kept from excessive contact with particles containing the other type of reactive group and little or no reaction can occur. Even after fuse-drying, contact of isocyanate groups with ureido groups is probably not excessive because thorough molecular mixing of the two terpolymers has not occurred. Stretching of the fiber undoubtedly results in a more intimate molecular mixture, bringing more of the respective groups into positions where chemical reaction can occur.

Although the isocyanate group has limited life in water, by spinning the emulsion mixture soon after preparation, a sufficient number of isocyanate groups are apparently left in the resulting fiber to be effective.

*Example 51*

A dispersion is prepared as in Example 1 except that 3 parts of sodium oleate is used as the emulsifier and the monomer charge is 50 parts of ethyl acrylate, 45 parts of acrylonitrile, and 5 parts of epsilon-ureidopentyl vinyl ether. This dispersion is passed through a 40-hole spinnerette at the rate of two grams per minute into an aqueous solution at 70° C. containing 4% hydrogen chloride and 1% aluminum sulfate. The diameter of each spinnerette hole is 0.0025 inch. The bundle of filaments is drawn from the bath at a rate of 8.5 meters per minute, fuse-dried at 130° C. on a heated, rotating drum, passed through a melt of 4,4'-diisocyanatodiphenylmethane at 50° C., and heat-stretched at 140° C. to give a yarn of 140 denier. The yarn is cured at constant length for 30 minutes at 150° C. The resulting yarn has the following properties: tenacity (65% R.H., 72° F.), 1.5 grams per denier; and extensibility (65% R.H., 72° F.), 50%.

When heated to 100° C., the yarn shrinks about 11% as compared to over 60% for a control yarn which had not been treated with diisocyanate and cured.

*Example 52*

The same procedure is used as in Example 51, except the yarn is treated before fuse-drying with 2,4-tolylene diisocyanate at room temperature and the yarn after fuse-drying and stretching is cured at 70° C. for 26 hours. The resulting yarn has the following properties: denier, 135; tenacity (65% R.H., 72° F.), 1.4 grams per denier; and extensibility (65% R.H., 72° F.), 45%.

When heated to 100° C. the yarn shrinks about 28%.

*Example 53*

A dispersion is prepared as in Example 51 except that the monomer charge is 50 parts of ethyl acrylate, 45 parts of acrylonitrile and 5 parts of epsilon-hydroxypentyl vinyl ether.

This dispersion is spun as in Example 51 except that the coagulating bath is an aqueous solution of 4% hydrogen chloride and 1.0% zirconium chloride.

The yarn is post-treated as in Example 51. The resulting yarn has the following properties: tenacity (65% R.H., 72° F.), 1.4 grams per denier; and extensibility (65 R.H., 72° F.), 55%.

When heated to 100° C., the yarn shrinks about 16%.

*Example 54*

To 200 parts of distilled water is added 15 parts of sodium tert-octylphenoxyethoxyethyl sulfate and the pH is adjusted to 6.8 with 0.5 N sodium hydroxide solution. A mixture of 75 parts of acrylonitrile and 25 parts of 3,3,5-trimethylcyclohexyl acrylate is added with stirring and the air above the resulting emulsion is replaced by nitrogen. An ice bath is placed around the reaction vessel and 0.5 part of $\alpha,\alpha'$-azodiisobutyronitrile is added. A source of ultraviolet light is placed about 16 inches from the glass reaction vessel. These conditions are maintained for 2½ hours.

The resulting dispersion is spun by capillary as described in Example 13 except an aqueous coagulating bath of aqueous 10% phosphoric acid at 85° C. is used. The filament formed is dried at 260° C. and stretched about 600% to give a filament of the following properties: denier, 13; tenacity (65% R.H., 72° F.), 2.5 grams per denier; and extensibility (65% R.H., 72° F.), 18%.

We claim:

1. A process for making self-supporting fibers, filaments, yarns, and films of synthetic polymers which comprises passing an aqueous dispersion having a pH of at least 7, formed with an acid-sensitive emulsifier which loses its dispersing capacity in an acid medium, containing at least 20% by weight of a water-insoluble thermoplastic addition copolymer of at least two monovinylidene compounds at least one of which contains a polar group, the copolymer being present in said dispersion in a particle size less than two microns, having a molecular weight of at least 20,000, and having an apparent second order transition temperature, $T_i$, between 30° and 150° C., through an orifice as a stream into an acidic aqueous coagulating bath having a pH of not over 4.1 and a temperature above the apparent second order transition temperature of the copolymer in the condition of solvation in which it enters the coagulating bath, whereby a shaped product is formed from the stream, drawing the product through the bath, drying the product, and heating the product in a zone held at a temperature above the apparent second order transition temperature, said temperature being at least 60° C., for a time sufficient to bring the product above its apparent second order transition temperature but below the temperature at which decomposition occurs, and to cause coalescence of particles therein.

2. A process as defined in claim 1 in which the dispersion is passed through the orifices of a spinneret having a plurality of orifices whereby the shaped product formed is a multifilament yarn.

3. A process as defined in claim 1 in which the coagulating bath temperature is in the range of 50° C. to 105° C. and the temperature of the heating zone is between 60° and 400° C.

4. A process as defined in claim 3 in which the dispersion is passed through the orifices of a spinneret having a plurality of orifices whereby the shaped product formed is a multifilament yarn.

5. A process as defined in claim 3 comprising the additional step of stretching the coalesced product.

6. A process as defined in claim 3 comprising the additional step of stretching the coalesced product 50% to 2000%.

7. A process as defined in claim 3 in which the copolymer concentration in the dispersion is 25% to 65%.

8. A process according to claim 7 wherein the acid-sensitive emulsifier is a water-soluble salt of a long-chained monocarboxylic acid.

9. A process as defined in claim 7 in which the dispersion contains a solvent for the copolymer which remains dissolved within the copolymer in the presence of water.

10. A process as defined in claim 7 in which the dispersion contains 10% to 20% of a solvent for the copolymer which remains dissolved within the copolymer in the presence of water.

11. A process as defined in claim 7 in which the coagulating bath contains dissolved therein 0.05% to 1% of a water-soluble polyvalent metal salt.

12. A process as defined in claim 7 in which the coagulating bath has a pH of not over one.

13. A process for making self-supporting fibers, filaments, yarns, and films of synthetic polymers which comprises passing an aqueous dispersion having a pH of at least 7, formed with an acid-sensitive emulsifier which loses its dispersing capacity in an acid medium, containing at least 20% by weight of a thermoplastic material comprising a water-insoluble addition copolymer of a mixture of copolymerizable monoethylenically unsaturated monomers comprising at least one polar compound selected from the group consisting of vinyl acetate, acrylonitrile, methacrylonitrile, acrylamide, methacrylamide, esters of acrylic acid, and esters of methacrylic acid, the copolymer being present in said dispersion in a particle size less than two microns, having a molecular weight of at least 20,000, and having an apparent second order transition temperature, $T_i$, between 30° and 150° C., through an orifice as a stream into an acidic aqueous coagulating bath having a pH of not over 4.1 and a temperature in the range of 50° C. to 105° C. and above the apparent second order transition temperature of the copolymer in the condition of solvation in which it enters the coagulating bath, whereby a shaped product is formed from the stream, drawing the product through the bath, and subsequently heating the product while still wet with water in a zone held at a temperature in the range of 60° C. to 400° C. and above the apparent second order transition temperature of the product for a time sufficient to (1) bring the product above its apparent second order transition temperature but below the temperature at which decomposition occurs, (2) dry said product, and (3) cause coalescence of particles therein.

14. A process as defined in claim 13 in which the dispersion is passed through the orifices of a spinneret having a plurality of orifices whereby the shaped product formed is a multifilament yarn.

15. A process as defined in claim 13 in which the copolymer contains a cyclic group.

16. A process for preparing strong, self-supporting fibers, filaments, yarns, and films of thermoplastic copolymers which comprises passing an aqueous dispersion of a thermoplastic copolymer, which has an apparent second order transition temperature, $T_i$, between 30° and 150° C. and which contains chemically reactive groups capable of reacting with a polyfunctionally reactive cross-linking compound, through a shaping orifice directly into an aqueous acid coagulating bath having a temperature between 50° and about 105° C. and a pH of not over one, whereby particles of said copolymer are formed into a coagulated shaped product, drawing said shaped product through and out of said bath, heating said product between 60° and 400° C., whereby coagulated particles of the shaped product are coalesced, the heating being accomplished above $T_i$, treating the shaped product with a compound having radicals polyfunctionally and complementally reactive with the chemically reactive groups in the copolymer, heating the thus treated shaped product, and stretching it under tension between 50% and 2,000% between 70° and 300° C., said copolymer being a thermoplastic addition copolymer having a molecular weight above 20,000 from at least two polymerizable monovinylidene compounds at least one of which contains a said chemically reactive group, said copolymer being present in said dispersion in a particle size less than two microns and constituting 25% to 65% by weight of said dispersion, said dispersion having a pH above 7 and being formed with an acid-sensitive anionic emulsifier which loses its dispersing capacity in an acid medium.

17. A process according to claim 16 wherein the reactive groups of the copolymer are epoxy groups and the complementally reactive compound is an alkylenediamine.

18. A process for preparing strong, self-supporting fibers, filaments, yarns, and films of a thermoplastic copolymer which comprises passing an aqueous dispersion of particles of at least one thermoplastic copolymer, there being present in said copolymer particles of the dispersion several kinds of chemical groups reactive with each other, through a shaping orifice directly into an aqueous acid, coagulating bath having a temperature between 50° and about 105° C. and a pH of not over 4.1, whereby particles of said copolymer are formed into a coagulated shaped product, drawing said shaped product through and out of said bath, fuse-drying by heating said product between 60° and 400° C. and above the apparent second order transition temperature of the copolymer, whereby coagulated particles of the shaped product are coalesced, stretching the coalesced shaped product under tension between 70° and 300° C. and heating the thus shaped product to complete reaction between the several kinds of mutually reactive groups, said copolymer being a thermoplastic addition copolymer being formed from at least two polymerizable monovinylidene compounds, having a molecular weight above 20,000, having an apparent second order transition temperature, $T_i$, between 30° and 150° C., and being present in said dispersion in an amount by weight between 25% and 65%, said dispersion having a pH above 7 and being formed with an acid-sensitive anionic emulsifier which loses its dispersing capacity in an acid medium, the particles in said dispersion supplying mutually reactive chemical groups.

19. A process for preparing strong, self-supporting fibers, filaments, yarns, and films of thermoplastic copolymers which comprises forming at a pH of at least 7 a first aqueous dispersion of particles of a thermoplastic addition polymer which contains one kind of chemically reactive groups, forming at a pH of at least 7 a second aqueous dispersion of a thermoplastic addition polymer which contains groups chemically reactive with said chemically reactive groups of the polymer of the first dispersion, mixing the first and second aqueous dispersions, the particles of both aqueous dispersions being dispersed with the aid of acid-sensitive emulsifier which loses its dispersing capacity in an acid medium, the size of particles being less than two microns, the polymer particles of the mixed dispersion constituting over 20% by weight thereof, and the solid polymer from the mixed dispersion having an apparent second order transition temperature between 30° and 150° C., passing the mixed dispersion through a shaping orifice directly into an aqueous acid coagulating bath having a temperature between 50° and about 105° C. and a pH of not over 4.1, whereby a coagulated shaped product is formed from the particles of the mixed dispersion, drawing said shaped product through and out of said bath, heating said shaped product between 60° and 400° C. and above the apparent second order transition temperature of the mixed polymer, whereby particles of the coagulated shaped product are coalesced, stretching the coalesced shaped product under tension between 70° and 300° C., and maintaining the product between 60° and 400° C. until reaction has occurred between the several kinds of mutually reactive groups.

References Cited in the file of this patent

UNITED STATES PATENTS

| | | |
|---|---|---|
| 2,402,846 | Ryan | June 25, 1946 |
| 2,530,362 | Morris | Nov. 14, 1950 |
| 2,559,750 | Berry | July 10, 1951 |
| 2,737,436 | Le Boeuf | Mar. 6, 1956 |

OTHER REFERENCES

"Fundamental Principles of Physical Chemistry" (Prutton and Marron), published by MacMillan (N.Y.), 1951 (pages 261 and 262 relied on).